Feb. 15, 1938.  W. E. GREENAWALT  2,108,118
METALLURGICAL FURNACE
Original Filed Feb. 4, 1933  4 Sheets-Sheet 1

INVENTOR
William E. Greenawalt

Feb. 15, 1938.  W. E. GREENAWALT  2,108,118
METALLURGICAL FURNACE
Original Filed Feb. 4, 1933  4 Sheets-Sheet 4

INVENTOR
William E. Greenawalt

Patented Feb. 15, 1938

2,108,118

UNITED STATES PATENT OFFICE 2,108,118

METALLURGICAL FURNACE

William E. Greenawalt, Denver, Colo.

Application February 4, 1933, Serial No. 655,201
Renewed February 24, 1936

19 Claims. (Cl. 13—20)

The invention relates, broadly, to metallurgical furnaces, and particularly to shaft furnaces adapted to the treatment of ores and other materials, without smelting. The invention is adapted to oxidation and to reduction of either ores or gases. It may effectively be used for sulphating, chloridizing, volatilizing, and various well known specific operations. Among the familiar processes to which it is applicable is, the oxidation of metallic ores preparatory to smelting or leaching; to sulphating or chloridizing of ores, such as those of copper and zinc, for leaching; the reduction of oxidized ores to metallize the metal constituents, such as the reduction of iron oxide to sponge iron and copper oxide to metallic copper; to the volatilization of metals, such as zinc, lead, copper, gold and silver, either through a reducing agent at a high temperature or as a volatile chloride; to the production of hydrogen sulphide from sulphur compounds as a reducing agent for use as a sulphidizing agent or as a precipitant for metals in solution; to the production of elemental sulphur from sulphur dioxide in the presence of a highly heated reducing agent, etc.

The object of the invention is to facilitate and cheapen roasting and reduction of ores and other materials; to provide cheaper and simpler furnaces of large or small capacities; to introduce various gases into the furnace and into the hot ore mass at various points and in regulable amounts; to dispense with the elaborate stirring mechanism ordinarily necessary in roasting furnaces; to more closely control the temperature in roasting in different parts of the furnace than has hitherto been possible; to practically eliminate dust loss and the expense of settling, collecting, and re-treating a large amount of dust, such as that produced in mechanically rabbled furnaces; and to cool the roasted or treated material in the furnace so that the heat and reacting gases may be used to further the general metallurgical operations, as, specifically, in the cooling of sponge iron or metallized copper.

The present invention may be considered as a more or less direct improvement on those described in my Patents No. 1,218,996, March 13, 1917, No. 1,468,806, Sept. 25, 1923, and No. 1,585,344, May 18, 1926.

While the invention may be used in various capacities, roasting of copper ores for leaching—the specific use for which it was first intended—will be kept somewhat in mind and will be described more in detail later.

In the accompanying drawings:

Fig. 5 is a cross section.

Fig. 7 is a cross section, and Fig. 8 is a longitudinal section of the cooling members of the furnace.

Fig. 11 is a cross section, and Fig. 12 a longitudinal section of a modified heating and gas supplying member.

Referring to the drawings, 1 is the steel shell of a shaft furnace, preferably air tight, or at least tight enough to prevent unusual leakage of air or gas under slight pressure, either in or out. 2 is a wall or brick lining, preferably of good heat insulating material to conserve the heat as much as practical. Arranged at different elevations and spanning across the space between the opposite longitudinal walls of the furnace are hollow heating members 3, preferably in the general form of a hollow rectangular beam, and designed to contain the electric heating element 4, and to receive air or other gas through the gas inlet pipe 5. The hollow heating member 3 may be constructed of various materials. For low temperatures some form of heat resisting metal alloy, such as those made of various proportions of iron, chromium, manganese, nickel, silicon, etc., may be used. Spaced within the interior of the hollow heating member and supported by it, are electrical insulators 6 to insulate the electric heating element 4 from the heating members 3, to sustain the electric heating element in position, and to give it the necessary support between the extreme ends. The electric heating element may be a high heat and electric resisting alloy, such as "nichrome", or a non-metallic high heat and electrical resisting material, such as "globar". Globar may be used for all temperatures, but it will always be used for excessively high temperatures. The electric heating element is supplied with electricity through the conductor rods 7. The flow of electricity is regulated by means of the ordinary electrical instruments for that purpose to get the furnace temperatures desired, and its flow should be so arranged that a certain safe maximum temperature cannot be exceeded, to guard against injurious or destructive over-heating of both the ore and the hollow heating member. The gas inlet 5 is provided with a suitable valve 14 to regulate the flow of gas.

The hollow heating members 3 are preferably arranged in removable relation to the steel shell 1 and the brick, or refractory, lining 2. This is done by means of openings in the steel shell and brick wall somewhat larger than the heating member. The upper side space between the hollow heating member and the brick wall is filled with a compressible heat insulating material 8, inserted after the hollow heating member is in position. The hollow heating member is somewhat shorter than the outside width of the furnace, and the space between the steel shell and the ends of the hollow heating member is filled in by a compressible heat insulating material or slab 10. The interior ends of the hollow heating member are filled in with a heat insulating material 9, provided with suitable openings for the gas pipe 5 and electric conductors 7. A plate 11, provided with suitable openings for the gas pipe and electric conductor, is screwed to the steel shell, thus securing the insulating material around the heating member, and making the furnace reasonably air tight. The compressible heat insulating materials 8 and 10 permit of the expansion and contraction of the hollow heating member without injury to the steel shell, the furnace wall, or the heating member itself. The entire steel shell is preferably lined with a good heat insulating material 12 to protect the steel shell, to avoid unusual heat for the attendants, and to minimize the loss of heat through radiation. The gas inlet pipe 5 is provided with a T 13, and a regulating valve 14; the end of the T is provided with a removable glass plug 15 by means of which the interior of the furnace and of the hollow heating member can be seen at any time, and, when desired, the glass plug can be removed and a pyrometer element inserted for temperature readings. Other openings for use as peep holes and temperature readings may be provided as desired.

The hollow heating members may be designed in various ways and of various materials, depending on the material to be treated in the furnace and the results desired. Their position in the furnace will be similarly determined. If the electric heating element is unaffected by the material in the furnace, or by the gases which may be released or introduced, the form shown in detail in Figs. 3 and 4 will ordinarily be used. If it is desired to isolate the electric heating element from the furnace material and from the gases which may be released or introduced, the form shown in detail in Figs. 5 and 6 will ordinarily be used. In the first form the external air or other gaseous fluid is introduced into the upper part of the hollow heating member; it then flows downwardly in contact with the highly heated interior walls of the hollow heating member and in contact with the electric heating element into the hollow space 16 below the hollow heating member and into the ore mass. The gas will ordinarily be preheated, but not usually to the temperature of the interior of the furnace. The gas, in flowing through the hollow heating member, in contact with its interior walls and with the electric heating element, will become highly heated before it is introduced into the ore in the furnace, while, at the same time, there will be a tendency to cool the hollow heating member to prevent excessive local heat. The gas, first flowing in contact with the inside and then with the outside of the hollow heating member, as also in contact with the particles of ore slowly flowing by in close proximity to the hollow heating members and then diffusing itself through the ore, will tend to make the temperature uniform at the various levels of the furnace. The cooling effect of the gas is applied where it will do the most good in preventing excessive local temperature in the hollow heating members and in their immediate vicinity, while at the same time the heating effect of the hot diffused gas will do the most good in heating the ore which is not in direct contact with the hollow heating members. In the second form, as shown in detail in Figs. 5 and 6, the electric heating element is entirely enclosed and shielded from direct attack of either the material being treated or the gases liberated in the furnace or introduced from the outside. The heating is done by external contact of both ore and gases. The gas is introduced through the gas inlet 5 into a chamber 17 in the lower part of the hollow heating member 3. The chamber 17 is open to the furnace at the bottom and communicates with the unfilled space 16 below the hollow heating member. The gas is distributed horizontally in the chamber 17, in contact with the hot interior top and side walls, then flows into the unfilled space 16 and comes in contact with the exterior surface of the heating member and with the ore in its immediate vicinity, and is then diffused through the ore mass. The gas, introduced from the outside, will usually be more or less preheated.

It will be observed that by the construction described, the hollow heating member can be removed and replaced without interfering with the permanent furnace structure. When a hollow heating member is worn out and it is desired to replace it with another, the steel plates 11 and the insulating materials 8, 9, and 10 are removed, and the heating member is slid through the opening, which can easily be done by means of a block and tackle arrangement suspended from the structural work of the building over the furnace. Similarly, a new heating member is inserted, the heat insulating materials replaced, and the plates 11 screwed to the steel shell. The electric heating elements will usually require attention more frequently than the replacement of the heating members. To replace the electric heating element in a hollow heating member, the plates 11 are unscrewed and the insulating materials 9 and 10 are removed, thus exposing, at both ends, the entire interior of the hollow heating member. The worn out electric heating element is removed, without interfering in any way with the hollow heating member, and a new electric heating element inserted. The electric insulators 6 may similarly be removed and replaced. The heat insulating materials 9 and 10 and the plates 11 are then put back in position. This can be done while the furnace is in operation.

Different gases may, and frequently will, be introduced into the furnace through, or in connection with, the hollow heating members, at different levels of the furnace. The temperature of the various gases and their introduction into the furnace at different levels, may be regulated as desired. The introduction of steam is frequently necessary or desirable, and, for the purpose of this invention, steam may be considered as the equivalent of a gas or gaseous fluid. The introduction of steam has an extremely cooling effect on the furnace, and its first effect will be to cool the heating members, and thus to become superheated, which will ordinarily be highly desirable.

Figure 1:
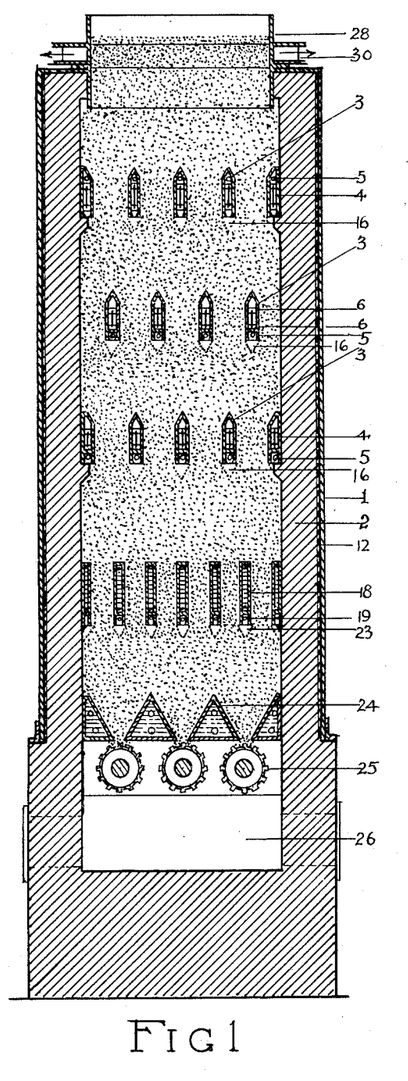
Fig. 1 is a longitudinal section of the furnace and Fig. 2 the corresponding cross section on the center line of Fig. 1.
Figure 2:
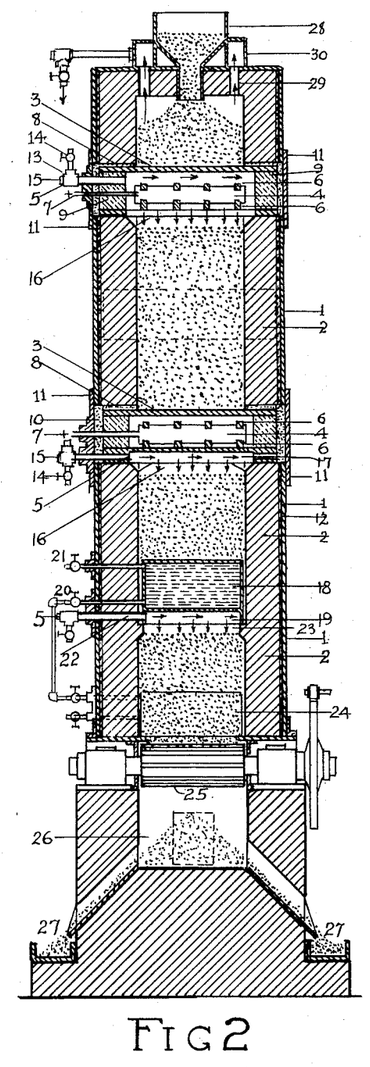

The introduction of air or other gas into the furnace, as embodied in this invention, presents an interesting and important angle. If gas is introduced into the ore mass of a shaft furnace its distribution and flow becomes something of a problem, especially if much of the material is very fine. How this difficulty is overcome or minimized will appear from the following considerations: Assuming, merely for illustration purposes, a furnace four by six feet inside, hollow heating members six inches wide, and that the angle of repose of the ore in the unfilled space 16 below the hollow heating members is not less than 45 degrees; the exposed ore area for each heating member to the entering gas would then be one foot wide and four feet long, or four square feet. For the equivalent of twelve unfilled spaces, as shown in Figs. 1 and 2, the total exposed ore area would be 48 square feet, or twice the horizontal, or hearth, area of the furnace, and the gas would not ordinarily have to travel in any horizontal direction from the point of its introduction into the ore, a distance of over four to six inches, assuming that the heating members are spaced eight to twelve inches apart.

The number of hollow heating members for any furnace and their spaced positions both vertically and horizontally will vary greatly, and will depend principally on the size of the furnace, the material to be treated, the results desired, and the temperature necessary to most effectively carry out the reactions, and all of these factors will be mostly determined by the experience gained for the different uses. Ordinarily, it will be desirable to have more heating members at a lower temperature than fewer heating members at a higher temperature, but as the time of treatment of the material in the furnace in any case is relatively long because the volume is relatively large, a vertical spacing of the heating members of from two to four feet will cover most conditions. If there are several tiers, vertically, of heating members, they are preferably placed in staggered relation to break up channels of either ore or gas, if formed.

The hollow heating members are preferably rectangular or elongated in vertical cross section, and preferably relatively high and relatively narrow, because such a general beam shape is the strongest for any given weight of material composing the beam, and since the ore to be treated is hot, the strength of the highly heated beam, or hollow heating member, is a matter of importance. The uniformly distributed load will rarely exceed 15 pounds per square inch of horizontal beam area, and will usually be very much less. Nevertheless, the beam, or hollow heating member should be designed to avoid appreciable sagging under such a small load for an indefinite time. Again, a beam, or hollow heating member, which is relatively high and relatively narrow, presents the best conditions for heating the ore and gas in contact with it. If the beam, or hollow heating member, is assumed to be 18 to 36 inches high, the ore will be in contact with, or in proximity to, it for a considerable time as it descends. The slow descent of the ore will also tend to break up gas or ore channels if formed, and to prevent agglomeration and possible clogging of the ore in case of accidental excessive temperature.

Figures 7, 8:
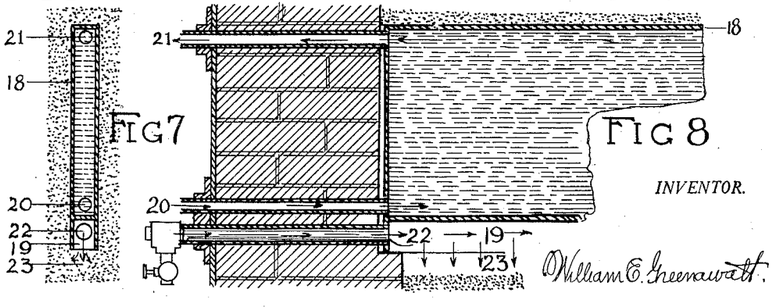

When the ore has been properly roasted, or treated, in the upper part of the furnace, it descends into the cooling zone in the lower part. The cooling is effected by means of a series of narrow water jackets 18 of considerable height, shown in detail in Figs. 7 and 8, through which cooling water is circulated. The water jackets are spaced as closely as practical without danger of stopping the free flow of the ore downwardly. The water jackets, like some of the hollow heating members, are preferably made with a hollow chamber 19, below the water chamber, through which gas, introduced into the chamber by means of the gas pipe 22, may be distributed through the ore through the unfilled space 23. The gas, heated in cooling the ore, ascends into the hot reacting zone above. The gas may be air, but frequently it will be some reducing agent like sulphur dioxide, hydrogen, or a hydrocarbon. The pipe for the inflowing water into the jacket 18 is shown by 20 and that of the outflowing water by 21. The gas, introduced through the gas inlet 22 and heated in the cooling part of the furnace, offers a means for recovering a portion of the heat applied to the charge in the upper part of the furnace. Similarly, heated water may be used for leaching or as pre-heated water for steam boilers in power development. Considerable gas may be introduced into the furnace through the hollow chamber 19 and the unfilled space 23 below the water jackets. If the jackets are four inches wide, the ore surface exposed to the gas in the unfilled space 23 will be about 8 inches wide, and in a four by six foot furnace the total ore area exposed for all the jackets would be about 18 square feet, as compared with 24 feet—the total horizontal, or hearth area of the furnace. And, as in the case of the hollow heaters, the cooling gas does not have to travel more than four inches in its horizontal distribution.

The water jackets 24 at the bottom of the furnace are arranged in hopper form so as to direct the cooled ore upon a limited part of the surface of the rotary exhaust cylinders 25. These cylinders are arranged transversely of the furnace and are intended to uniformly lower the entire column of ore and thus prevent channelling or short circuiting of the ore or gas and to assist in uniformly heating or cooling the ore column at its different levels. The water used in the jackets 24 is preferably afterwards used in the jackets 18 to bring it to the temperature desired for other uses. The exhausted ore, fed in a uniform continuous stream from the furnace into the space, or pocket, 26, flows into a trough 27 from which it may be conveyed, either wet or dry, to any point desired.

The vertical distance between the lower hollow heaters and the upper cooling jackets 18 will be largely determined by the material being treated and the results desired. Ordinarily it will be desirable to take advantage of the hot ore below the lowest hollow heaters to advance desired reactions before the ore is cooled beyond the effective reacting temperature. This is largely accomplished by introducing a reacting gas into the lower part of the ore column through the hollow space in the water jackets, as described. The reacting gas is distributed through the ore in the vicinity of its introduction—that is to say at the level of the hollow chamber 19 and the unfilled space 23—and as it ascends, it will cool the ore, and the gas will gradually be heated to the temperature of the ore column in the vicinity of the hollow heating members. This serves two advantageous purposes; first, to cool the ore as it descends into the vicinity of the water jackets, and, second, to heat the gas to the reacting temperature of the ore above the water jackets. The water jackets will not have much cooling effect until the ore comes in contact with them. If the vertical distance between the lower heating members and the water jackets is, say, ten feet, most of the ten feet will be at the reacting temperature without further additional heating, for the reason that there is very little heat lost through radiation and heating of an excessive amount of cold air or gas, as in ordinary furnaces. The finishing reactions in the lower part of the furnace will usually be relatively small and hence will not require a large amount of reacting gas. The small excess of reacting gas will advantageously be consumed in the upper part of the furnace.

The ore can be effectively cooled in a comparatively short distance of water jacket space, because the water jackets 18 can be spaced as close as practical without danger of clogging the downward flow of the ore. Ordinarily a spacing of from four to eight inches apart will be about right, and, as these jackets may be presumed to be from 18 to 36 inches in height, the ore will be in proximity to, or in immediate contact with, the jackets in its slow downward movement for a considerable time. A hollow iron or steel jacket in the form of a high rectangular beam, always at a comparatively low temperature, will carry with ease all the weight that can possibly be put upon it under the conditions. The weight would probably never exceed 30 pounds per square inch of horizontal area of uniformly distributed load, and will usually be very much less.

Similarly, the hopper jackets 24 offer no unusual problem, because they are always cool, and the major portion of the weight of the ore column has already been taken by the heating members and rectangular water jackets.

Similarly, the rotary cylindrical exhausters 25 offer no unusual problem. They will work at ordinary temperatures, and, with the weight of the ore already borne by the various heating members and cooling water jackets, the weight of the ore on the exhaust cylinders will be extremely small. The shaft on which the cylinders are mounted may be unusually large. The rotation of the cylinders is very slow, whether operated continuously or intermittently. They are preferably driven by worm gears. Ordinarily the cylinders will be operated continuously. If, for metallurgical reasons, it should be desirable to operate them intermittently, so as to feed out several feet of ore rapidly, to cut away the bottom of the ore for a rapid descent of a few feet of the entire column at one time, the driving mechanism will be modified accordingly. The exhausting arrangement is designed so that there will not be any great danger of short circuiting either the ore or gas, irrespective of whether the exhaust cylinders are operated continuously or intermittently.

The ore, in its descent through the furnace, will have little chance to agglomerate, form clinkers, or clog. The idea in all uses of the furnace would be to avoid excessive temperature; nevertheless, if the temperature should accidentally become excessive so as to fuse the ore particles, clinkers will not form if the ore is at all times in slow motion. The temperature should be automatically regulated within a few degrees of that determined to be metallurgically the best for any specific use. This is not practical in ordinary mechanical furnaces where there is no safe control for flashing of the ore particles as they drop from one hearth to another, or to excessive heating due to the impingement of hot air against over-heated ore in the wake of the moving rabbles.

The ore is fed into the furnace through the hopper 28 and acts as a seal to prevent the inflow of air and the outflow of furnace gas. The gas flues 29 and 30 should be under slight suction. If the suction is induced mechanically, it can be regulated as desired, and this, with the introduction of the reaction gas under a slight pressure, will induce the proper flow of gas through the ore column in the furnace.

In roasting copper or zinc ores for leaching the temperature should rarely, if ever, exceed 1100 deg. F. (593 deg. C.) for the copper ores and 1200 deg. F. (649 deg. C.) for the zinc ores, and at a temperature of about 1500 deg. F. (816 deg. C.) it is quite safe to use heat resisting metal alloys for the hollow heating members. If the temperature is closely regulated some of these alloys might be safe at 1820 deg. F. (1000 deg. C.) with a small reasonable factor of safety. If the working temperature of, say, 1500 deg. F. is exceeded, the strength of the hollow heating members, or beams, rapidly diminishes, and a point is ultimately reached when it becomes undesirable or impractical, even under a small evenly distributed load, to use metal alloys in the heating members spanning the width of the furnace. Then, too, many metallurgical and chemical operations require a higher temperature than is ordinarily used in roasting copper and zinc ores. Under such conditions it is desirable, and may be necessary, to eliminate the intermediate hollow heating members by narrowing the width of the furnace and providing ample support for the hollow heating members in connection with the longitudinal walls of the furnace, as shown in Figs. 9 to 14. The rear wall of the hollow heating member is supported continuously on the furnace wall, and the entire member is supported at intervals by brackets, or corbels, arranged so that gases may be introduced into the furnace through the spaces between the corbels. Metal alloys may be used for the hollow heating members under somewhat higher temperatures than under the conditions of a hollow beam supported only at the ends, but for the higher temperatures it will be advisable to use a much higher heat resisting material than metal alloys, such as carborundum or carbofrax, which will stand up under all temperatures likely to be used in any process in connection with this type of furnace, and which will rarely, if ever, exceed 2500 to 3000 deg. F. (1371 to 1649 deg. C.). Similarly, it will be necessary, at the higher temperatures, to use a higher heat resisting material than a metal alloy for the electric heating element. Globar may be used for either high or low temperatures, and will answer the requirements for high temperatures.

Figure 3:
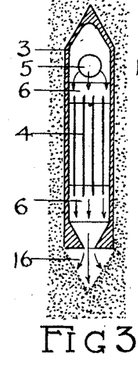
Fig. 3 is a cross section, and Fig. 4 the corresponding longitudinal section of the heating members in which gas is introduced into the interior of the heating member above the electric heating element and then passes into the furnace.
Figure 4:
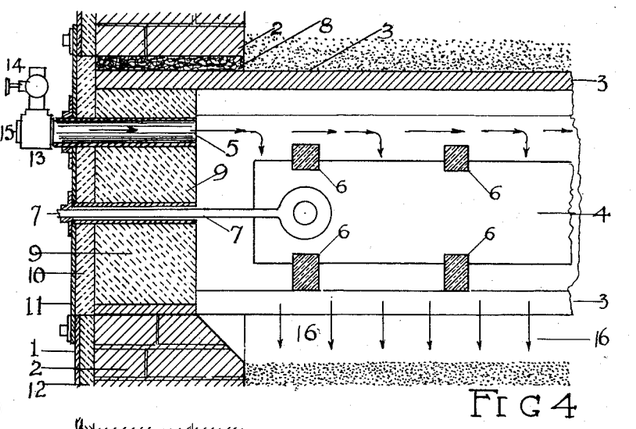
Figure 5:
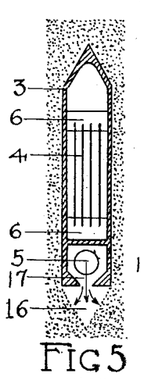
Figure 6:
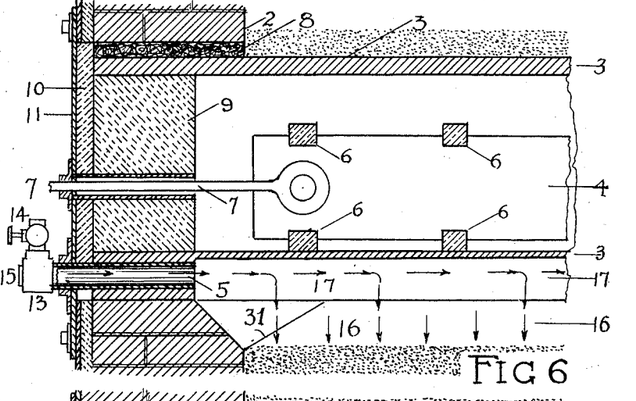
Fig. 6 is a longitudinal section of the heating members of the furnace in which the gas is introduced into the furnace below the electric heating element and out of contact with it.

It frequently happens that ore to be roasted or material to be treated should be given a preliminary heating before the more specific treatment is applied. If, for example, the material to be treated is a sulphide ore to be roasted, it is desirable to supply an abundance of air in the upper part of the furnace to first oxidize a large part of the sulphur and heat the ore before the more expensive localized heat and the specific reacting gases are applied. Similarly, if the material to be treated is iron or copper ore to be reduced either partly or to the metallic state, coal is usually added to the charge and air is supplied in the right amount in the upper part of the furnace to bring the ore to the desired temperature before the more specific application of the electric heat and reducing gases. In all such cases the electric heat simply represents the increment heat to sustain or somewhat increase the temperature of the previously heated ore and to provide the temperature for the reactions, independently of the chemical reactions between the ore and the applied reacting gases. Usually the temperature in the upper part of the furnace for the preliminary heating will be so low as not to jeopardize the strength of the hollow heating members, especially if regulable air is abundantly supplied to the ore through them. Under such conditions it may be desirable to have a few hollow heating members 3 spanning the upper part of the furnace to supply an abundance of air to quickly heat the charge, and, in case the ore is a sulphide, to quickly eliminate the greater portion of the sulphur. If the charge in the furnace is open, it is preferred to supply the air through hollow heating members having solid sides and a bottom outlet, as shown in Figs. 3, 4, 5 and 6. If, however, the furnace charge is fine, it is desirable to supply a maximum amount of air, which may be done by means of hollow heating members as shown in detail in Figs. 11 and 12. In these figures 3 is the hollow heating member composed, preferably, of a heat resisting alloy, which, in addition to the regular air outlet in the bottom, has air outlets 40 in the side walls, so designed that the air may flow outwardly while preventing the descending ore in the outside from flowing in. This arrangement also gives a large ore surface exposure to the air. If a small amount of dust gets into the interior of the hollow heating member, it will fall to the bottom and again join the descending ore on the outside. 32 is the electric heating element, resting on the electric insulators 36. Gas is introduced through the inlet 5 and its flow is regulated by the valve 14. A removable glass plug 15 is placed in the T 13 for visual inspection of the interior of the hollow heating member, and which may be removed to take temperature readings.

The strength of any hollow beam—in this case the hollow heating member—whether made of metal or non-metal material, is greatly strengthened, or made resistant to sagging under heat, as the span is diminished. This may be done by corbels, or brackets, 31, made of strong heat resisting material such as carborundum or carbofrax.

Figure 9:
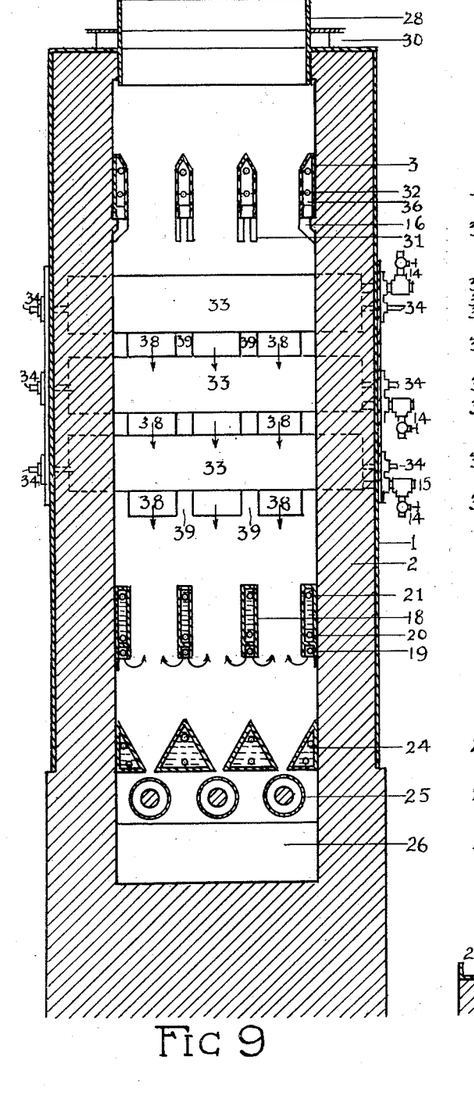
Fig. 9 is a longitudinal section of a modified furnace, intended for higher temperatures than the form shown in Figs. 1 and 2.
Figure 10:
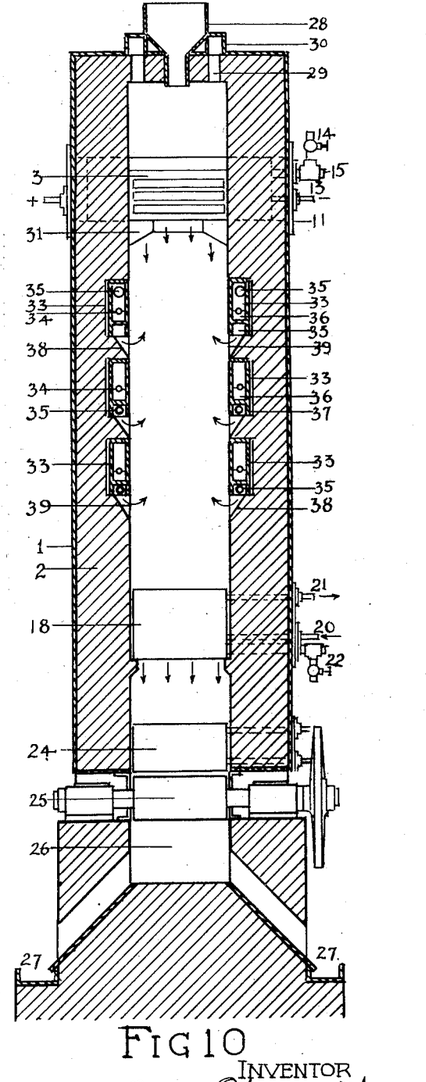
Fig. 10 is the corresponding cross section.
Figures 11, 12:
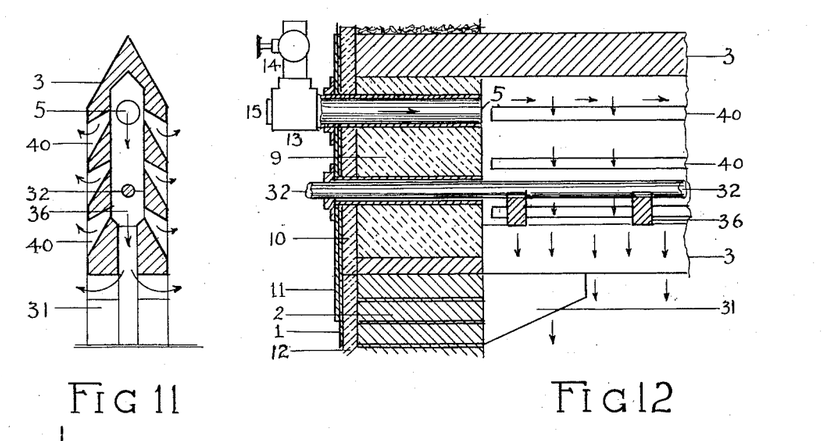

In some cases it may be desirable or necessary to omit the hollow heating members 3, as shown in Figs. 9 and 10, and depend on the excess heat and gas from the highly heated lower part of the furnace to supply the necessary heat and gas for the preliminary heating of the new charge, introduced at the top.

When the heat and gas are diffused through the furnace charge through the side walls of the furnace, as shown in Figs. 9, 10, 13, 14 and 15, the width of the furnace is necessarily limited by metallurgical considerations, because the heat and gas should, theoretically, be uniformly diffused through the entire mass. A width of from two to four feet will ordinarily be practical, although the ultimate width limit will depend largely on the material being treated and the results desired, and no specific limit is intended. If the temperature is high—higher than that at which metallic alloys can be used—it is preferred to use a high heat resisting non-metallic material, such as carborundum or carbofrax, for the hollow heating members, and non-metallic electric heating elements, such as globar, for the electric heating elements. The carbofrax, while not as strong as a metallic alloy, is much stronger than fire brick, resists heat much better, and has a heat conductivity ten times that of fire brick. As shown in Figs. 9, 10, 13, 14, and 15, it will be seen that the hollow heating member is continuously supported lengthwise by the furnace wall on recessed high heat resisting brick 38, so that gas may flow from the interior of the hollow heating member into the material being treated in the furnace. In addition, corbels 39 made of material which has considerable strength at high temperatures, such as carbofrax, supports at intervals the entire heating member. Under such conditions the heating member has its greatest practical strength and resistance to sagging under high temperatures. The back of the hollow heating member is preferably insulated with a high heat insulation material 8, and this will also allow some latitude in removing and replacing heating members.

Figure 14:
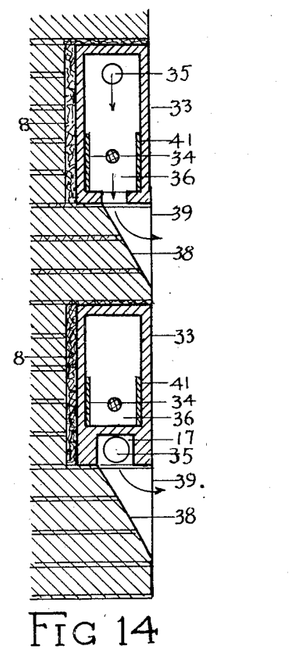
Fig. 14 is much the same, except that a metal alloy is used as the heating member.
Figure 15:
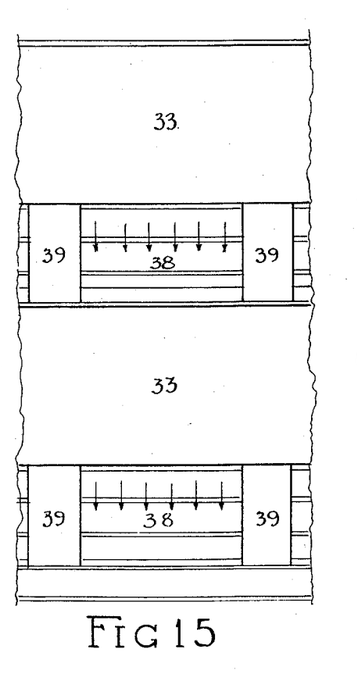
Fig. 15 is the corresponding elevation of both sections.

If metallic hollow heating members are used as shown in Fig. 14, it will be desirable to interpose heat diffusing plates 41 between the electric heating element 34 and the interior sides of the hollow heating member 33.

Figure 13:
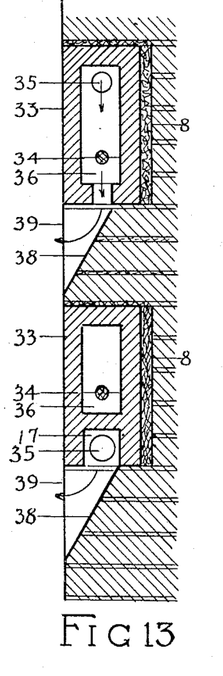
Fig. 13 is a detail cross section of the heating members shown in Figs. 9 and 10, in which a high heat resisting material, such as carborundum or carbofrax is used as the heating member.

The width of the furnace is necessarily limited on account of metallurgical considerations, but the length is not necessarily so limited. The lengths may ordinarily range between five and twenty-five feet. Ordinarily, for the same large capacity, it would be better to build two moderate sized furnaces than an excessively large one. The interior walls of the furnace as shown in Figs. 9, 10, and 13 will be at a high temperature, and, while the amount of air or gas that can be percolated through the ore, if fine, may be small, the total area for gas introduction will be comparatively large. If, for example, the length of the furnace is ten feet and the heated vertical surface is twenty feet and the heating members are spaced two feet apart, vertically, the total ore area exposed to the inflowing gas will be 100 square feet, or two and one half times the horizontal, or hearth area of the furnace, assuming the furnace to be four feet wide. If the furnace is only two feet wide it would have five times the horizontal area. If the ore is not very fine and granular, any reasonable amount of gas may be introduced into the furnace and distributed through the ore. Ordinarily, the amount of gas introduced into the lower part of the furnace will be relatively small. In roasting copper ore, for example, the principal reactions, such as oxidation and elimination of sulphur, will have taken place in the upper part of the furnace, and the gas introduced into the lower part will be merely that required to give the finishing touches—to oxidize remaining iron, sulphatize the copper, and break up insoluble copper compounds, such as ferrites, either with oxidizing or with reducing gases.

The operation of the furnace, in its application to a few typical uses, will be briefly described, and while the description will be reasonably definite, it will be understood that both the operation and the results may vary within fairly wide limits.

*Roasting copper ore for leaching.*—In roasting copper core for leaching the temperature at the start should be as low as practical until the larger portion of the sulphur is eliminated, or from 700 to 850 deg. F., (371 to 454 deg. C.) which is scarcely a visible red. The metal alloy hollow heating member in the upper part of the furnace will not be appreciably affected by either the heat or the gases at these temperatures. After the preliminary heating and roasting, during which time from 50% to 75% of the volatile sulphur has been driven off, the temperature is raised, but should never greatly exceed 1100 to 1200 deg. F. (593 to 649 deg. C.), and should not usually exceed 1000 deg. F. (538 deg. C.). If provision is made for an extreme temperature of 1500 deg. F. (816 deg. C.) there would be an ample factor of safety for practical operations, using a metallic alloy for the hollow heating member and either a metallic alloy, such as "nicrome" or a non-metallic substance, such as "globar" for the electric heating element. If, through thermostat control, the hollow heating members could not exceed, say, 1100 to 1200 deg. F., the heating members and the electric heating elements would last indefinitely. The furnace, in this case, may be reasonably wide. If the furnace is six feet wide and twenty-five feet long, and has an effective reaction height of twenty feet, the weight of the ore in the reacting zone is about 150 tons. If the ore is under an average treatment of 12 hours in the reacting zone in passing through the furnace, the daily capacity will be 300 tons, and if the time of reacting treatment is 8 hours, the daily capacity will be 450 tons. In multiple hearth furnaces the total time of treatment usually varies from six to eight hours.

The ore will, ordinarily, be charged into the furnace wet, or moist, and well mixed, to give the greatest porosity. Once the ore is ignited, either through the hot ore and gas from below or through the heating members, the roasting will usually proceed without much external heat in the upper tier of heating members, but the heating should always be such that all the ore in the different vertical zones is at the desired temperature and so that no ore will pass from an upper to a lower zone without having first received its proper treatment for that zone. As the ore descends, the heat producing sulphur is eliminated, and the increment of heat must be added through the electric heating elements and hollow heating members. This will usually be relatively small, for the reason that the amount of gas introduced after most of the sulphur has been oxidized is not very large, and there is no great amount of heat lost through radiation and in heating large quantities of air composed mostly of nitrogen, which is unavoidable in the operation of reverberatory furnaces. In reverberatory furnaces, a large excess of air and of combustion gas and heat is introduced into reverberatory furnaces toward the end of the roasting to keep the ore at the necessary temperature to complete the reactions. If air is properly applied to a hot sulphide particle, it can be oxidized, or roasted, in a few seconds. Half of the sulphur in the ore, combined with iron as pyrite, does not need any air for its elimination; it is distilled off at the upper part of the ore column at a low temperature.

Gases, such as sulphur dioxide may be introduced into the hot ore in the lower part of the furnace, especially through the water jackets. That the sulphur dioxide is effective in breaking up ferrites and greatly increasing the solubility of the copper is evident from the results recorded in my Patent No. 1,468,806, Sept. 25, 1923, but the operation can be carried out more effectively through the present invention whereby both the gas and the temperature are under excellent control. Sulphating of the copper in the furnace is largely due to the formation of sulphur trioxide from sulphur dioxide in the presence of iron and copper oxides, both of which act effectively as catalytic agents to promote the reaction. That the temperature and its close regulation is an important factor is evident from the tests recorded by Rideal and Taylor, in "Catalysis in Theory and Practice", page 84. The percent conversion of sulphur dioxide to sulphur trioxide, according to their graph, for various temperatures, is as follows:

| Centigrade | Fahrenheit | Per cent conversion $SO_2$ to $SO_3$ |
|---|---|---|
| 400 | 752 | 16 |
| 450 | 842 | 20 |
| 500 | 932 | 37 |
| 550 | 1022 | 46 |
| 600 | 1112 | 38 |
| 650 | 1202 | 25 |
| 700 | 1292 | 17 |

It will be seen therefore that if sulphur dioxide is introduced into the ore column through the hollow chambers of the heating members or, preferably, the hollow chambers and unfilled space of the water jackets, the sulphur dioxide, in ascending through the hot ore in the lower part of the furnace will have every opportunity to be converted into sulphur trioxide, and then act as a highly efficient agent for sulphating the copper to make it soluble, and this is the primary object of a sulphating copper roast. Since the gas can be introduced in rather concentrated form, such as the sulphur dioxide taken from the top of the furnace, the amount needed will be relatively small and will be easily diffused through the ore. Concentrated sulphur dioxide is more effective than the dilute gas. This finishing step is intended to make up the difference between a low and a high extraction of the copper by leaching. Ferric sulphate, formed in the upper part of the furnace begins to decompose at about 896 deg. F. (530 deg. C.), to form ferric oxide, and the released acid radical acts energetically to sulphate the copper. Copper sulphate begins to decompose at 1207 deg. F. (653 deg. C.), and, by a close regulation of the temperature, it should be practical to oxidize the iron and make it insoluble, while still preventing excessive ferrite formation, or insolubility, of the copper; but this step is so delicate that, ordinarily, it can only be ineffectively realized; nevertheless, in the present invention, temperature and gas conditions are so closely under control that greatly improved results may be expected. If the copper sulphate in the roasted ore in the lower part of the furnace is to be converted into the oxide, as may at times be desirable, the temperature may be raised to a little higher than 1207 deg. F., but only if the temperature can be closely controlled. The basic copper sulphate, CuO.CuSO$_4$, requires a temperature of 1299 deg. F. (704 deg. C.) but it is highly improbable that such a temperature can be used without injuriously affecting the ore for leaching. It is probable that most of the reacting temperatures are effected, and usually lowered, by foreign elements, such as the reaction gases and silica in the ore. Ferrites are not formed appreciably below 1100 deg. F. (593 deg. C.), and ferrites that are formed can be reduced and the copper made soluble by the reducing gas, such as sulphur dioxide, hydrogen, or a hydrocarbon, introduced into the lower part of the furnace. If sulphur dioxide is used as the reducing gas it is probable that the efficiency of ferrite reduction will depend upon the efficiency of the conversion of sulphur dioxide to sulphur trioxide, and the conditions for effecting this change are realized to a high degree in the present invention. If exceptionally rich sulphur dioxide gas is desired it may be obtained by introducing oxygen-enriched air into the furnace and into the ore through the gas inlets in the hollow heating members.

What has been said in reference to roasting copper ores applies, with slight modifications, to roasting zinc ores. The temperatures may be slightly higher.

In roasting for smelting, where it is desirable to eliminate only a portion of the sulphur and where the chemical combinations and the physical conditions of the roasted ore are of no great importance, the invention offers advantages over present practice, for the reason that the unit capacity is large, the enclosing building is relatively small and of simple construction, and the dust nuisance, even at the worst, would be a mere fraction of that ordinarily encountered, especially if the ore is charged wet or moist and well mixed into the furnace. The temperature in roasting for smelting need not be closely controlled, but the safe limit for the hollow heating members and the electric heating elements should not be exceeded. This safe limit, for all ordinary operations, whether roasting for leaching or for smelting, will rarely, if ever, exceed 1500 deg. F., and the special grades of heat resisting metallic alloys are abundantly safe at this temperature.

The expense of electric heat as compared with fuel heat is a vital consideration, and for that reason the furnace should be constructed and operated with the greatest possible conservation of heat, but when it is considered that from 50% to 80% of the heat generated in reverberatory roasting furnaces is lost, the expenditure for a relatively small amount of electric heat, effectively applied and efficiently conserved, may not ordinarily greatly exceed the cost of fuel heat. The saving in installation and operation costs, aside from the heat, will be greatly in favor of the present invention as compared with reverberatories. If, for example, a 6 by 25 foot furnace with a roasting height of 20 feet, previously referred to, has a capacity of from 300 to 450 tons of ore per day, as suggested, it would take the place of from three to nine multiple hearth furnaces of about 25 feet diameter, each having a capacity of from 50 to 100 tons per day; this would represent a considerable saving in furnace installation, dust chambers, and buildings, and also a considerable saving in attendance, repairs, dust recovery, and re-roasting of the dust. If the object of the roast is simply to eliminate a portion of the sulphur, as in roasting for smelting, it might be done by the introduction of air through the hollow members, without electric heat, but it would be desirable to make provision for heating, especially in the lower part of the heating zone, or if only for emergency.

*Sponge iron.*—In the production of sponge iron, either for the precipitation of copper from solutions or for other purposes, the operation of the apparatus may be briefly described as follows: The iron ore, preferably a porous iron ore sinter crushed to a suitable size, 4 to 8 mesh, with the extreme fines removed, mixed with the required amount of carbon—from 60 to 80 parts of carbon to 100 parts of ore—such as coal, charcoal, or coke, is fed into the furnace, and assuming the furnace to be in operation, a certain amount of air is supplied to the ore in the upper part of the furnace to cheaply bring the charge to the desired temperature, which will usually be a red heat. The hot mixture of ore and carbon descends below the shallow heating and oxidizing zone and immediately enters the reducing zone, which is preferably maintained at a temperature ranging from 875 to 950 deg. C. (1607 to 1742 deg. F.), in which the carbon, uniting with the oxygen of the iron oxide, produces metallic, or sponge, iron. At the temperatures indicated the reduction is fairly rapid and the reaction should be completed in from two to four hours. If the temperature is below 850 deg. C. (1562 deg. F.) the reaction is slow and may, on appreciable drop in temperature, cease; at 1000 deg. C. (1832 deg. F.) the reaction becomes rapid, but if the temperature is considerably higher the particles are likely to slightly sinter. One of the oustanding difficulties in making sponge iron is to prevent the re-oxidation of the porous iron during cooling from the temperature of formation to atmospheric temperature. This is easily done by excluding air from the lower part of the furnace, or cooling zone, and, preferably, by introducing a reducing gas, through the water jackets as described, into the cooling sponge iron. The cooling iron is, therefore, immersed in a reducing atmosphere, and the amount of this reducing atmosphere may be very small. Any excess ascends in the furnace and acts as a reducing agent for the iron oxide in the upper, or reacting, part of the furnace. There is little danger of re-oxidation of any of the sponge iron if it is properly cooled to a temperature of from 400 to 500 deg. C. (752 to 932 deg. F.) before it comes in contact with the air, especially in the presence of an excess of carbon, which will practically always be the case. By the time the sponge iron is discharged from the furnace it will be cool enough to handle it in any ordinary way.

Reduction of limonite and hematite to magnetite: The reduction of limonite and hematite to magnetite, for the purpose of magnetic concentration, is much the same as that described for the reduction of iron ore to sponge iron, except that the process is simpler; the temperature is lower and the reaction is quicker.

*Reduction of oxidized copper ore.*—It frequently happens that copper occurs in oxidized form, usually as carbonate or silicate, with a gangue high in calcium or other acid-consuming elements, which makes acid leaching impractical. The copper in such ores can be metallized, or reduced to metallic form, much the same as in iron ore reduction to sponge iron. A temperature of from 350 to 450 deg. C., (662 to 842 deg. F.) will ordinarily suffice for efficient reduction. And, as in the case of iron ore reduction, great care has to be taken to prevent re-oxidation of the reduced copper. After the copper is metallized it can be separated from the gangue by flotation or gravity concentration, or preferably by both combined. If the ore contains precious metals, as frequently happens, they will be concentrated in about the same proportion as the copper. The temperature of the reducing action is so low that the hollow heating members can be made of heat-resisting metal alloy and they should last indefinitely.

*Reduction of zinc oxide.*—If zinc oxide, or roasted zinc concentrate, is reduced and the zinc distilled or volatilized, a temperature of about 1000 deg. C. (1832 deg F.) will be required, in the presence of a highly reducing gas, such as hydrogen, water gas, or natural gas. If coal alone is used the temperature of distillation will be somewhat higher. The design of the furnace as shown in Figs. 9, 10, and 13 will probably give the best results for temperatures greatly exceeding 1000 deg. C. At the high temperature necessary to reduce zinc oxide and iron oxide it will be desirable, perhaps necessary, to introduce a heat diffusing member 41, Fig. 14, between the electric conductor 34 and the interior sides of the hollow heating member 33. The object, in any case, is to heat the hollow heating member as uniformly as possible, not only to prevent its local overheating, but also to best diffuse the heat through the material in the furnace.

*Hydrogen sulphide.*—In the production of hydrogen sulphide from sulphur dioxide and carbon, or reducing agent, a temperature of from 932 to 1202 deg. F. (500 to 650 deg. C.) will usually be best. Above this temperature, say from 1292 to 1652 deg. F. (700 to 900 deg. C.) much of the sulphur will be distilled in elemental form in the presence of a highly reducing gas.

*Reduction of sulphur dioxide to elemental sulphur.*—For the reduction of sulphur dioxide to elemental sulphur in the presence of highly heated coke, a temperature of about 2030 deg. F. (1100 deg. C.) is desirable.

*Sulphuric acid manufacture.*—In the manufacture of sulphuric acid it is usually desirable, altho not necessary, that the gas should be as rich in sulphur dioxide as possible. This can readily be done by the present invention because air can be supplied in the amounts desired in the upper part of the furnace, which, taken with the sulphur that is distilled in elemental form and later oxidized, will give an exceptionally rich gas. The relatively small amount of air introduced into the lower part of the furnace, either through the heating or cooling members, will be highly oxidizing and eliminate the sulphur to a high degree, and, as it rises through the hot ore it will finally emerge at the top with practically all of the oxygen converted into sulphur dioxide.

If an excessively high sulphur content of the gas is desired, as for the manufacture of liquid sulphur dioxide or for the conversion of the sulphur into elemental form, oxygen-enriched air may be introduced into the lower part of the furnace. Oxygen-enriched air may also be used if a greater oxidation is desired than is practical with air alone.

Various other uses of the invention will suggest themselves, but those described will suffice to explain its application and operation.

The height and shape of the furnace will depend on the material to be treated and the results desired. The hollow heating members may be heated otherwise than by electricity, but it is not advisable to do so, except perhaps in extreme cases where close temperature regulation is not necessary and if contaminating combustion fuel gases are not harmful. The hollow heating members, as in all hollow beams to gain strength, may be designed with an abundance of metal at the top and bottom.

Air, introduced through the hollow heating members would supply the oxygen necessary for some operations, such as roasting sulphide ore, without accessory heat, but the operation would be crude, and if the air is supplied in insufficient amounts the fire will die out, and if supplied in excess, the ore will sinter and agglomerate. By independently supplying the increment, or regulable, heat within a maximum and minimum limit, any desired conditions may be maintained indefinitely. If sintering and agglomeration is harmless or desired, as may frequently happen for some uses of the furnace such as roasting ore for smelting, the increment heat may be supplied as needed. It would also be possible to introduce gas through some of the hollow members and exhaust it through others, but such a use would be exceptional. For exceedingly low temperatures it would be practical to heat the interior of the hollow heating member with superheated air or gas, and then percolate the gas, or a portion of it, through the ore. In any event, no matter to what temperature the gas may be preheated before it is introduced into the hollow heating member, it will be desirable to have the electric heating element in the hollow heating members to control the temperature and to supply the increment heat at a relatively low cost for electric heating.

Excessive rabbling or stirring of the ore is not necessary for effective oxidizing or reducing roasting, provided the ore is moved slowly and continuously in the presence of an abundance of moving reacting gas. In the present invention the ore moves, or flows, downwardly through the furnace, preferably in a continuous uniform stream, while at the same time the reacting gas flows upwardly through the ore and in intimate contact with it. The hollow heating members, in addition to transmitting the necessary heat and gas to the ore, function much the same as rabbles to mix the ore and gas. Ordinarily, as in roasting sulphide ore, the greatest amount of air or gas is needed at the upper part of the shaft, and hence has a shorter distance to travel or to percolate through the ore column. In some cases partly roasted or heated ore may be introduced into the furnace to complete the roasting. Since the gas in the lower part of the heating zone of the ore column need only be sufficient in amount to complete the reactions, the amount of gas may be relatively small and the gas may be highly concentrated; its percolation through the ore may be slow, and hence not a great deal of heat or gas is wasted or used in completing the reactions. In roasting in a reverberatory furnace, when the sulphur in the ore is largely oxidized, the temperature falls, and this usually necessitates the consumption of a considerable amount of fuel to maintain the finishing temperature and to heat the large amount of useless air or gas.

The percolation of the air or gas through the ore in the shaft is facilitated by introducing the gas under considerable pressure; it also favorably affects the reactions. The steel shell is intended to be reasonably tight, and gas introduced in the middle or upper part of the ore column will flow out at the top. The height of the ore column in the cooling section of the shaft is intended to be sufficient to prevent escape of gas through the bottom. The heat and the suction at the top of the furnace will also tend to move the gas upwardly.

I claim:

1. A metallurgical furnace comprising, a vertical shaft adapted to contain the material to be treated, means for heating the material in the upper part of the shaft, a cooling member in the lower part of the shaft consisting of an enclosed upper chamber and an open lower chamber, means for introducing a cooling medium into the enclosed upper chamber, and means for introducing a gaseous fluid into the open lower chamber and into the material in the furnace.

2. A furnace comprising a vertical shaft adapted to contain the material to be treated, hollow heating members elongated in vertical cross section spanning across the upper part of the shaft between its interior side walls, hollow cooling members elongated in vertical cross section spanning across the lower part of the shaft between its interior side walls, means for heating the interior of the hollow heating members, means for supplying a cooling medium to the hollow cooling members, and means for flowing the material through the furnace shaft in a substantially vertical column.

3. In the cooling section of an ore treating furnace, a stationary hollow cooling member contacting with the hot ore and having a closed compartment for circulating a cooling medium and an open compartment to receive gaseous fluid, means for supplying a cooling medium to the closed compartment, and means for introducing gaseous fluid into the open compartment and from there into the treating furnace.

4. A metallurgical furnace comprising, a shaft adapted to contain a column of the material to be treated, a hollow heating member embedded in the material and extending from one side of the shaft to the other, an electric heating element within the hollow heating member, and means for passing gaseous fluid through the hollow heating member in contact with the electric heating element and delivering it into the material in the shaft.

5. A metallurgical furnace comprising, a shaft adapted to contain a column of the material to be treated, hollow beams elongated in vertical cross section spanning the shaft, electric heating elements within the hollow beams in removable relation to the beams when positioned in the furnace, means for introducing gaseous fluid into the interior of the beams and into the material in the shaft, and means for passing the material through the shaft in a substantially vertical column.

6. A metallurgical furnace comprising, a shaft adapted to contain a column of the material to be treated, a horizontal hollow beam elongated in vertical cross section within the shaft embedded in the material, an electric heating element within the hollow beam, and an electric insulator within the hollow beam supported by the beam and supporting the electric heating element.

7. A furnace comprising, a shaft adapted to contain a column of the material to be treated, a horizontal hollow beam elongated in vertical cross section in contact with the material, means for heating the interior of the hollow beam, means for introducing gaseous fluid into the interior of the hollow beam and from there into the material in the shaft, and means for passing the material through the shaft in a substantially vertical column.

8. A furnace comprising, a shaft adapted to contain a column of the material to be treated, horizontal hollow beams elongated in vertical cross section embedded in the material, said beams being spaced apart vertically and arranged in staggered relation, means for heating the interior of the hollow beams, means for passing gaseous fluid through the hollow beams and from there into the material in the shaft, and rotary members spanning the shaft below the ore column for passing the material through the shaft in a substantially vertical column.

9. A furnace comprising, a shaft adapted to contain the material to be treated, horizontal hollow beams elongated in vertical cross section in contact with the material, said beams being divided by a horizontal partition into an upper and a lower compartment, an electric heating element in the upper compartment, and means for introducing gaseous fluid into the lower compartment and into the material in the shaft.

10. A furnace comprising, a shaft adapted to contain a column of the material to be treated, horizontal hollow beams elongated in vertical cross section embedded in the material in the upper part of the shaft, horizontal hollow beams elongated in vertical cross section embedded in the material in the lower part of the shaft, means for heating the beams in the upper part of the shaft, means for passing a cooling medium through the beams in the lower part of the shaft, and rotary means spanning the shaft below the material column for removing a substantially horizontal section from the bottom of the material column.

11. A furnace comprising, a shaft adapted to contain a column of the material to be treated, horizontal hollow beams in the upper part of the shaft elongated in vertical cross section embedded in the material, an electric heating element within the hollow beams, means in the lower part of the shaft for cooling the material, means for introducing different gases at different elevations into the column of material, and means for passing the column of material through the shaft.

12. A furnace comprising, a shaft adapted to contain a column of the material to be treated, a horizontal hollow beam elongated in vertical cross section spanning the shaft and embedded in the material said hollow beam having downwardly inclined openings at its sides to prevent the flow of material into the beam, means for passing gaseous fluid through the beam, and means for passing the material through the shaft.

13. A furnace comprising, a shaft adapted to contain a column of the material to be treated, a horizontal hollow beam elongated in vertical cross section spanning the shaft and embedded in the material, said hollow beam having downwardly inclined openings at its sides to prevent the flow of material into the interior of the hollow beam, means for heating the interior of the hollow beam, means for passing gaseous fluid through the interior of the hollow beam into the material in the shaft, and means for passing the material through the shaft.

14. A metallurgical furnace comprising, a shaft adapted to contain a column of the material to be treated, means in the upper part of the shaft for heating the material, means in the lower part of the shaft for cooling the material, means for introducing an oxidizing gas into the material in the heating zone of the shaft and a reducing gas into the material in the cooling zone of the shaft and passing it through the heating zone, means for withdrawing both gases from the upper part of the shaft, and means for passing the column of material through the shaft.

15. A metallurgical furnace comprising, a vertical shaft adapted to contain the material to be treated, a hollow heating member contacting with the material in the shaft and extending from one side of the furnace to the other, an electric heating element within the hollow heating member spaced out of contact with it, and means for introducing gaseous fluid into the hollow heating member and into the material in the furnace.

16. A metallurgical furnace comprising, a chamber adapted to contain the material to be treated, a hollow heating member within the furnace contacting with the material in the shaft, a heating element within the hollow heating member spaced out of contact with it, and means for introducing gaseous fluid into the hollow heating member and from there into the material in the furnace.

17. A furnace comprising, a treating chamber adapted to contain the material to be treated, a horizontal hollow member elongated in vertical cross section within the treating chamber with its sole outlet for gaseous fluid through the material to be treated, means for heating the interior of the hollow member, means for passing gaseous fluid into the hollow member and from there into the material in the treating chamber, and means for passing the material through the treating chamber in a substantially vertical column.

18. A furnace adapted to contain the material to be treated, a horizontal hollow member in contact with the material in the furnace, said hollow member being divided into upper and lower sections both of which are adapted to contain gaseous fluid, means for controlling the temperature in the upper section, and means for introducing gaseous fluid into the lower section and from there into the material in the furnace.

19. A furnace comprising, a shaft adapted to contain the material to be treated, a horizontal hollow member within the shaft divided into separate upper and lower hollow sections, means for heating the upper section, and means for introducing gaseous fluid into the lower section and from there into the shaft.

WILLIAM E. GREENAWALT.